No. 751,089. PATENTED FEB. 2, 1904.
F. A. MALETTE.
METHOD OF MAKING CONCRETE BUILDING BLOCKS.
APPLICATION FILED APR. 17, 1903.
NO MODEL. 3 SHEETS—SHEET 1.
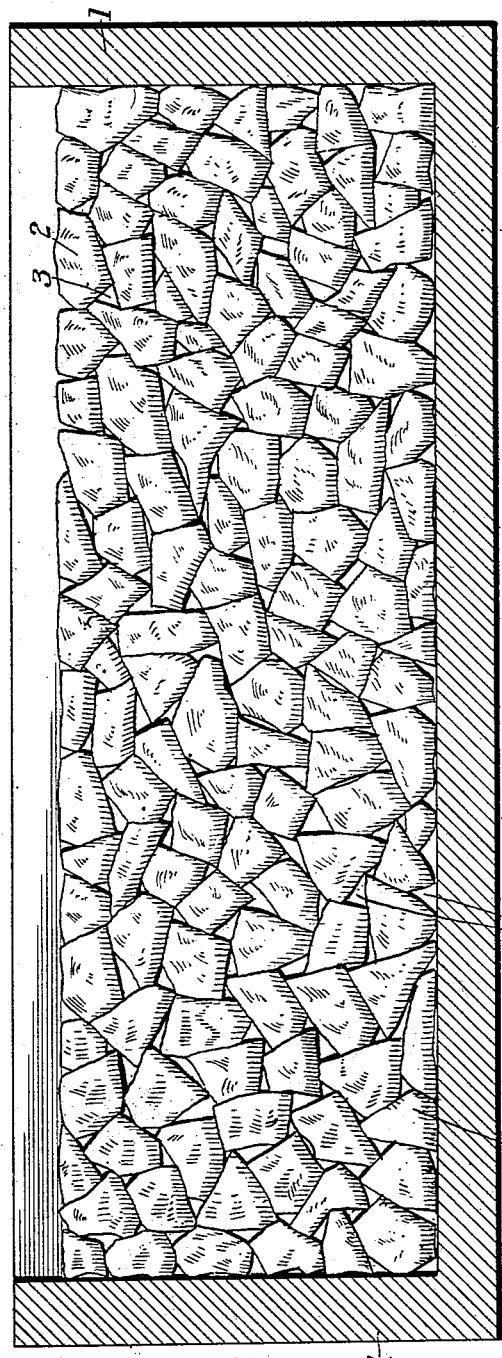
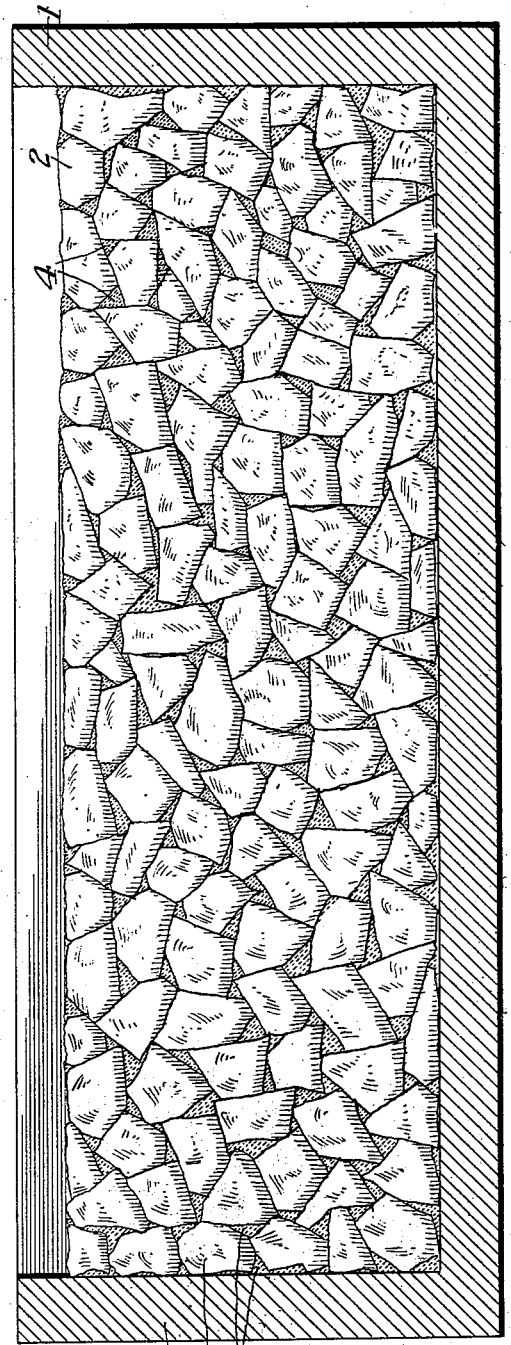
Witnesses:
Inventor:
Frederick A. Malette.
by Wm. Stockbridge
Atty.

No. 751,089. PATENTED FEB. 2, 1904.
F. A. MALETTE.
METHOD OF MAKING CONCRETE BUILDING BLOCKS.
APPLICATION FILED APR. 17, 1903.
NO MODEL. 3 SHEETS—SHEET 2.
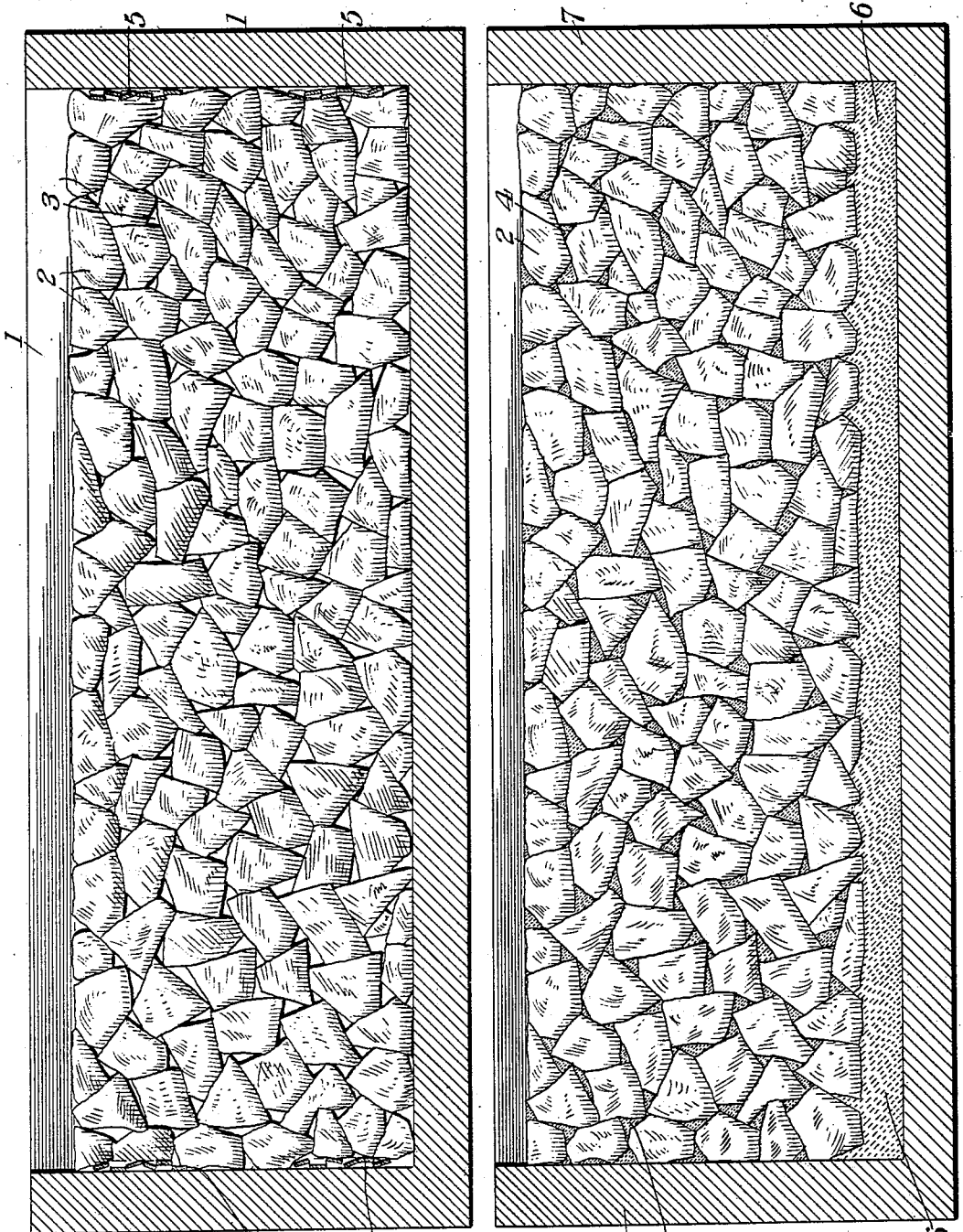
Witnesses:
C. G. Harbinger
H. L. Snyder
Inventor:
Frederick A. Malette.
by Wm. Stockbridge
Atty.

No. 751,089. PATENTED FEB. 2, 1904.
F. A. MALETTE.
METHOD OF MAKING CONCRETE BUILDING BLOCKS.
APPLICATION FILED APR. 17, 1903.
NO MODEL. 3 SHEETS—SHEET 3.
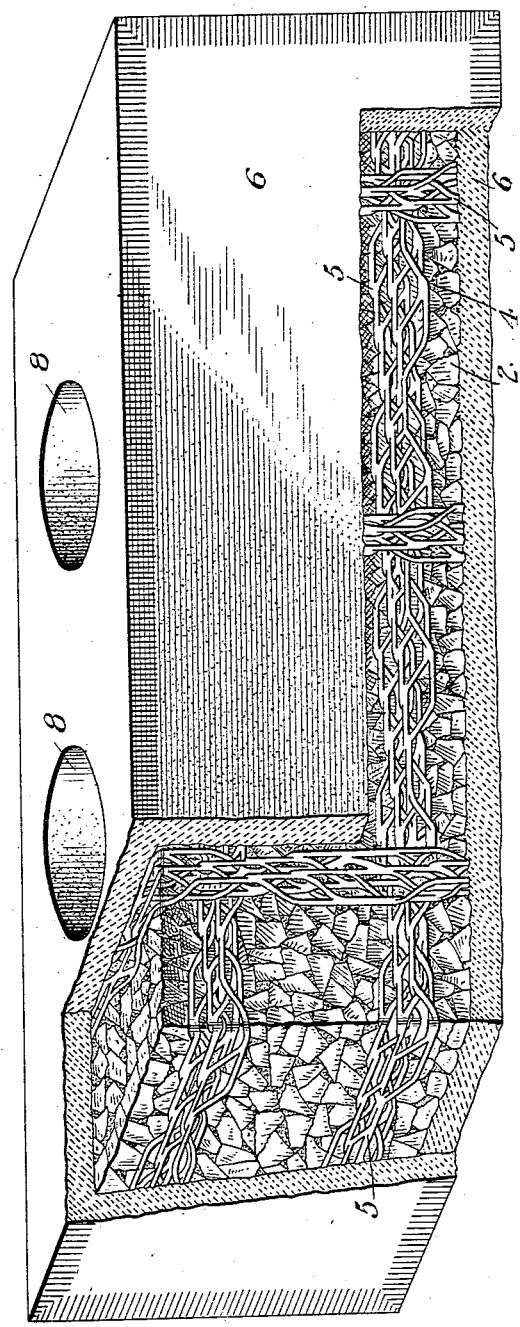
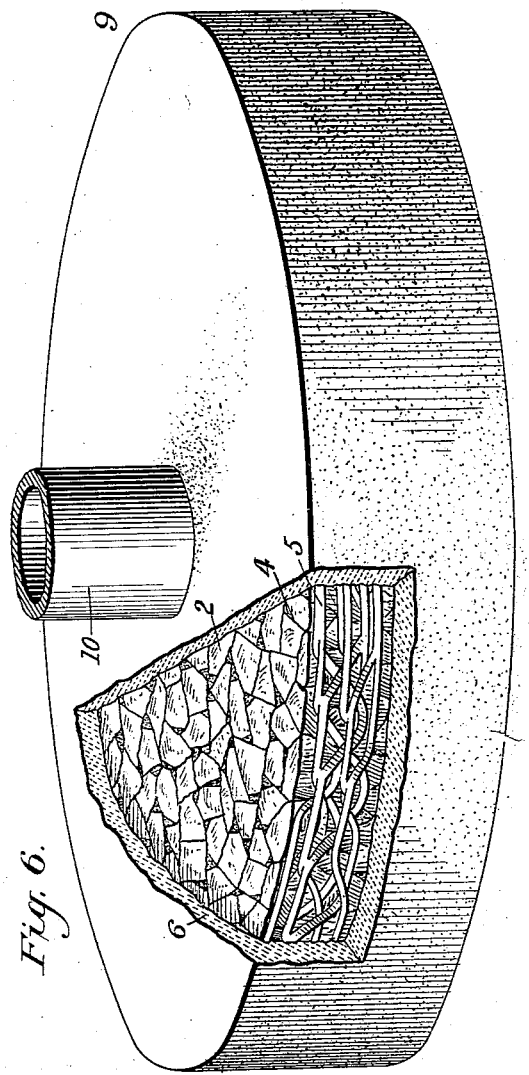
Witnesses:
Inventor:
Frederick A. Malette
by Wm. M. Stockbridge
Atty.

No. 751,089. Patented February 2, 1904.

UNITED STATES PATENT OFFICE.

FREDERICK A. MALETTE, OF GENEVA, NEW YORK.

METHOD OF MAKING CONCRETE BUILDING-BLOCKS.

SPECIFICATION forming part of Letters Patent No. 751,089, dated February 2, 1904.

Application filed April 17, 1903. Serial No. 153,040. (No model.)

*To all whom it may concern:*

Be it known that I, FREDERICK A. MALETTE, a citizen of the United States, residing at Geneva, New York, have invented a new and useful Method of Making Concrete Building-Blocks, of which the following is a specification.

My invention is designed for the production of an improved concrete building-block or the like having all the features of merit of the ordinary artificial building block or stone, with the advantage thereover of greater strength, rigidity, and strain-resisting power and the further advantage that it may be more easily and cheaply constructed.

The invention consists in the method of making the bulding-block.

In carrying out the invention crushed or broken stone is covered with a coating of mortar, preferably composed of sand and hydraulic cement or of sand, hydraulic cement, and stone dust or screenings. This coating is applied to the surfaces of all the individual stones. Afterward the crushed stone thus coated is placed in a mold, and by compression, either by pounding or otherwise, the stones are bonded together, the bonding being effected by the compression to which the stones are subjected independent of the action of the cement. By thus bonding the stones together the spaces or voids between them are not filled. After the bonding a suitable mortar of thin consistency—composed, for example, of hydraulic cement and sand or stone dust, or both—is poured upon the bonded mass of stone and allowed to flow down and fill a considerable portion of the spaces between the stones. The voids are thus filled after the bonding of the stone instead of at the same time, as is done according to the usual method of mixing concrete when the aggregate and mastic are combined in the same operation. The bonding of the large stones themselves in the first operation makes the completed work much stronger than when dependence is placed entirely upon the cement and mortar. This is due to the fact that the original or natural strength of the individual stones is utilized, that the same are enabled to lie in close contact with each other at their adjacent points, and that they are maintained in such condition by the pressure to which they are subjected. Where a large block is to be made, the filling of the voids with thin mortar must be effected during the operation of building up the block, for the reason that with a very thick or high block the thin mortar will not flow from the top to the bottom, so as to fill the voids or spaces between the stones. In making a large block I proceed in the same manner as above described, except that a larger mold is employed, which is first only partially filled with the broken stone coated with mortar. The mass of stone is subjected to compression, as before, by pounding or in any other suitable way, and the voids or spaces between the stones are afterward filled by pouring thereon a mortar of thin consistency, preferably composed of hydraulic cement and sand or stone dust or screenings. When this has been completed, more of the broken stone coated with mortar is placed in the same mold on top of the mass previously treated and subjected to compression, as before. Afterward the voids or spaces between the stones of the upper mass are filled in the same manner as above described. These steps are repeated until a block of the proper thickness has been completed. For securing additional strength or reinforcement, as in the case of a large block or pillar, expanded metal or its equivalent may be embedded in the block during the course of its construction. This is done by introducing the expanded metal into the mold before the mass of mortar-coated stones is placed therein and proceeding in the manner above described in the construction of the block. When the mortar with which the stones are originally coated and that with which the voids or spaces between the stones are filled has become set, the expanded metal will be interlocked and interwoven with the mass of stone along the outer surface thereof and will serve to impart greater stiffness and rigidity thereto. The use of the expanded metal in the construction of the building-block has the further advantage of providing projections to which a surface coating of mortar may secure itself when the same is applied in the completion of the block. The expanded metal may of course be applied in other ways than as described. For example, it may be connected with the body of the block after the latter has been completed. Furthermore, wire-cloth or other suitable material may be employed as a substitute for the expanded metal.

When the building-block constructed according to my improved method is to be used in exposed places, a surface coating will be applied to those faces thereof which are outermost and are exposed to view. This surface coating is made of mortar composed, for example, of hydraulic cement and sand or stone dust or screenings, the same being applied while in a plastic condition to the surface or surfaces of the block which are to receive the same and carefully rubbed down and smoothed out, so as to give the same a finished appearance and to render the surface of the block waterproof. It is best to apply this coating to the surface or surfaces of the block by the application of pressure in order to cause the mortar of which the surface coating is made to penetrate the spaces between the stones of which the body of the block is made at the surface thereof. In the actual construction of the block it is intended to apply the surface coating to the body, which is composed of the broken stones bonded together, either before the voids between the stones at the surface of the block have been filled with the thin mortar which is intended to fill the same or before said thin mortar has become hardened or set. A tight gripping action between the surface coating and the body of the block may thus be obtained.

The block may be made hollow, if desired, the only thing necessary to effect this result being to introduce one or more wooden or other cores into the mold prior to the introduction and compression of the mortar-coated stones therein, building up the block around said core or cores and afterward removing the same.

In the construction of pillars it is my purpose to make the same in sections, which are preferably tapering in form and are circular, elliptical, or other suitable shape in cross-section. Each of said sections will preferably be formed with a circular or other suitable opening therein at its center, so that in building up a pillar from the different sections the latter may be strung upon a metal tube or upright which extends through the openings therein.

In order that my invention may be the more readily understood, I have illustrated my improved block in the accompanying drawings in various stages of its completion.

Figure 1 is a sectional view of one of the molds employed, showing a block in its first stage—that is, after the mortar-covered stones have been introduced into the mold and bonded together by compression, but before the voids or spaces between the stones have been filled. Fig. 2 is a similar view showing a block in its mold after the voids or spaces between the stones have been filled. Fig. 3 is similar view showing a block built up in its mold with the expanded-metal reinforce. Fig. 4 is a similar view showing one means of applying a surface coating to the body of the block by the application of pressure. Fig. 5 is a perspective view, partly broken away, of a completed block having openings formed therein and provided with an expanded-metal reinforce; and Fig. 6 is a similar view of one of the block-sections employed in the building up or construction of a pillar, showing a metallic upright extending through the opening at the center thereof.

Like reference-numerals indicate like parts in the different views.

The mold 1 may of course be of any suitable shape, the particular shape being determined by the form which it is intended the completed block shall assume. Into this mold, as shown in Fig. 1 of the drawings, is placed a mass of mortar-coated stones 2, which while in the mold are subjected to compression without filling the voids, the said voids being indicated in Fig. 1 of the drawings by the numeral 3. In the same mold after the bonding by compression the mass of stones has poured thereon a layer of motor of thin consistency, which flows down through the spaces between the stones and fills or partially fills said spaces, as indicated at 4 in Fig. 2 of the drawings. When the block is to be supplied with a reinforce 5 of expanded metal, wire-cloth, or the like, the latter is introducee into the mold, as shown in Fig. 3 of the drawings, and the mortar-covered stones 2 compressed and bonded within it. The metallic reinforce may, however, be otherwise applied to the body of the block, if desired.

One means of applying the surface coating 6 to the block is illustrated in Fig. 4 of the drawings. The mass of mortar which is intended to form the surface coating of the block is placed in the bottom of a mold 7 while in a plastic condition, and a block consisting of the bonded mass of crushed or broken stones is placed down upon the mass which is to form the coating and pressure applied from above. The mortar of the coating is thus caused to penetrate the spaces or voids between the stones at the surface and when it hardens adheres closely thereto by being locked in place. As heretofore stated, it is preferred to apply the the surface coating 6 before the voids between the crushed stones along the surface to be covered have been filled or before the mortar filling said voids has become hardened. If the surface coating is to be applied to more than one face of the block, the mortar which is to constitute the same is introduced either at the side or top of the mold or at both places.

The openings 8 in the block may be produced by introducing cores into the mold 1, building up the block around said cores, and afterward removing the same.

The block-section 9 (shown in Fig. 6 of the drawings) is one which is intended to be used in the construction of a pillar. The same is made in a similar manner to the other forms of blocks described, but has been shown as circular in cross-section and as tapering from its base upwardly. Each section 9 is formed with an opening extending vertically therethrough to enable the different sections which go to make up a complete pillar to be strung upon a metallic tube or upright 10.

While I have described my invention as a method of making building-blocks, it is intended, of course, to cover a method of making posts, pillars, or other building stone or foundation.

Having now described my invention, what I claim as new, and desire to secure by Letters Patent, is—

1. The method of making concrete building-blocks and the like, which consists in coating the individual stones with mortar, subjecting a mass of the stones thus coated to compression and simultaneously molding said mass into proper shape, whereby the stones are bonded together independent of the action of the mortar and without filling the spaces or voids between them, beneath the surface of the mass, and afterward pouring a thin mortar onto the mass and allowing it to flow down into the voids between the stones and partially fill the same.

2. The method of making concrete building-blocks and the like, which consists in coating the individual stones with mortar, subjecting a mass of the stones thus coated to compression and simultaneously molding said mass into proper shape, whereby the stones are bonded together independent of the action of the mortar and without filling the spaces or voids between them, beneath the surface of the mass, afterward pouring a thin mortar onto the mass and allowing it to flow down into the voids between the stones and partially fill the same and finally applying a surface coating to one or more faces of the block thus formed.

3. The method of making concrete building-blocks and the like, which consists in coating the individual stones with mortar, subjecting a mass of the stones thus coated to compression and simultaneously molding said mass into proper shape, whereby the stones are bonded together independent of the action of the mortar and without filling the spaces or voids between them, beneath the surface of the mass, afterward pouring a thin mortar onto the mass and allowing it to flow down into the voids between the stones and partially fill the same, and finally applying a surface coating of fine mortar to one or more faces of the block, before the spaces or voids between the stones at the surface have been filled.

4. The method of making concrete building-blocks and the like, which consists in coating the individual stones with mortar, subjecting a mass of the stones thus coated to compression and simultaneously molding said mass into proper shape, whereby the stones are bonded together independent of the action of the mortar and without filling the spaces or voids between them, beneath the surface of the mass, afterward pouring a thin mortar onto the mass and allowing it to flow down into the voids between the stones and partially fill the same, and finally applying, with pressure, a surface coating of fine mortar to one or more faces of the block, before the thin mortar introduced into the voids has set.

5. The method of making concrete building-blocks and the like, which consists in coating the individual stones with mortar, subjecting a mass of the stones thus coated to compression, and simultaneously molding said mass into proper shape, whereby the stones are bonded together independent of the action of the mortar and without filling the spaces or voids between the stones beneath the surface of the mass, pouring a thin mortar onto the mass and allowing it to flow down into the voids between the stones and partially fill the same, subjecting another mass of the stones thus coated to compression above the mass originally treated and simultaneously molding the latter mass into proper shape, pouring a thin mortar onto the latter mass and allowing it to flow down into the voids between the stones and partially fill the same, and continuing these steps until a block of the proper size is made.

6. The method of making concrete building-blocks and the like, which consists in coating the individual stones with mortar, subjecting a mass of the stones thus coated to compression, and simultaneously molding said mass into proper shape within a band of expanded metal or the like with which the mass of stones is surrounded, whereby said stones are bonded together independent of the action of the mortar and without filling the spaces or voids between them beneath the surface of the mass, and afterward pouring a thin mortar onto the mass and allowing it to flow down into the voids between the stones and partially fill the same.

In testimony whereof I have hereunto set my hand in presence of two subscribing witnesses.

FREDERICK A. MALETTE.

Witnesses:
J. G. FARWELL,
I. V. TRAINOR.